Nov. 14, 1939.　　　G. A. TINNERMAN　　　2,180,266

FASTENING DEVICE

Original Filed Dec. 22, 1938

INVENTOR.
GEORGE A. TINNERMAN
BY Bates, Golrick, & Teare
ATTORNEYS

Patented Nov. 14, 1939

2,180,266

UNITED STATES PATENT OFFICE 2,180,266

FASTENING DEVICE

George A. Tinnerman, Rocky River, Ohio, assignor to Albert H. Tinnerman, Cleveland, Ohio Original application December 22, 1938, Serial No. 247,158. Divided and this application May 29, 1939, Serial No. 276,309

7 Claims. (Cl. 85—32)

This invention relates to fastening devices employing a thread engaging member in the form of a nut and particularly to a device that is adapted to be used in an assembly where it is necessary for a fastener to retain itself in bolt receiving position prior to the insertion of the bolt. The present application is a continuation in part of my copending application Serial No. 119,415, filed January 7, 1937, and is a division of my copending application No. 247,158, filed December 22, 1938.

An important purpose of the present invention is the provision of means associated with the nut for securing it to a structure with which it contacts, in such manner that it is not only held in fixed position but that the perforation in the structure through which the nut attaching means passes is closed or sealed by the securing means. Fasteners for accomplishing this purpose are useful, for example, in the assembly of an automobile body wherein an opening for receiving the fastener is accessible from only one side, and wherein the opening must be sealed to prevent the entrance of water or other foreign matter. A suitable location for an assembly of this nature is the fender of an automobile body. Additional uses for fasteners of this nature are in refrigerator cabinets where it is essential that the insulation carrying compartment may be sealed against entrance of moisture. Moreover, the invention possesses utility in railway cars, airplanes, steel tanks, furnaces and associated types of products.

An additional object is to provide an improved means of securing a nut to a structure with which it is associated, involving the application of the nut from one side of the structure opposite and the positioning of it in bolt receiving position on the opposite side.

Figure 2:
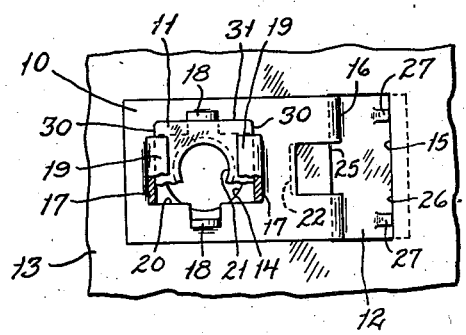
Figure 1:
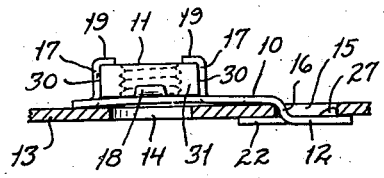
Figure 3:
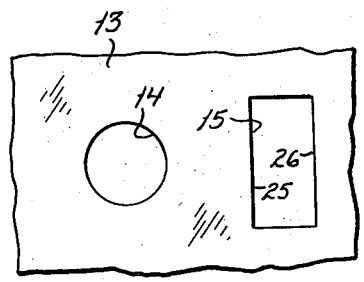

Referring now to the drawing, Fig. 1 is a section taken through a support with a fastener embodying my invention positioned thereon and Fig. 2 is a top plan view of the fastener shown in Fig. 1, and Fig. 3 is a top plan view of an article having openings therein for receiving the fastener and for receiving a threaded member with which the fastener is intended to be used.

The fastener which I have shown comprises a strip of sheet metal which has one portion 10 thereof adapted to receive and hold a nut 11 and another portion 12 thereof for holding the fastener in position upon a support indicated in general at 13. The support has a bolt receiving opening 14 therein and another opening 15 spaced from the opening 14, for cooperating with the strip in locking it to the support. In the preferred arrangement the strip is offset, as at 16, between the portions 10 and 12 so that the portion 10 may overlie one side of the support while the portion 12 underlies the other side of the support. This form of construction is suitable for enabling the end of the strip carrying the nut 11 to be passed upwardly through the aperture 15 during the assembling operation, it being understood that the nut 11 is attached to the portion 10 prior to such insertion.

One arrangement for attaching the nut 11 to the portion 10 comprises arms 17 that are struck from the body portion 10 and that engage opposite sides 30 of the nut 11 and also tabs 18 that are likewise struck from the body portion 10 for engaging opposite sides 31 of the nut 11. Additionally, the arms 17 may have flanges 19 that engage the top of the nut and hold it securely in position upon the strip. The opening 20 in the fastener body from which the arms 17 are formed is narrower than the width of the nut so that the nut is supported by the body portion 10 and is held thereagainst by the flanges 19. The opening 20 therefore is in registration with the opening 21 in the nut and is also in registration with the bolt receiving opening 14 in the support 13. Other ways may be utilized for holding the nut upon the strip but that illustrated is the preferred form.

To position the fastener upon the support, and at the same time to seal the opening 15, I prefer to form a tongue 22 by striking it downwardly from the body a sufficient distance to receive the support 13. The shoulder formed by the offset portion 16, therefore, is adapted to engage one wall 25 of the opening 15 while the opposite wall 26 may be engaged by a prong 27 which is struck from the portion 12 and which is so positioned thereon that when the offset part is forced against the wall 25, the prong 27 will snap into position against the wall 26. In Fig. 2, I have shown two prongs 27 whereby engagement with the wall 26 is provided at spaced intervals. Moreover, as shown in this illustration, the strip seals the opening 15 and at the same time makes a firm engagement with the supporting structure.

To position the fastener illustrated onto the support, the body portion 10 may be passed upwardly through the opening 15 after the nut 11 has first been rigidly attached to the body as previously described, and for such purpose the opening is sufficient in size to admit a nut of the desired thickness. Thereafter, the strip is tilted downwardly until the part 23 enters the space between the body 10 and the tongue 22. Further motion in a forward direction is continued until the tongue 27 clears the wall 26 and thereby locks the fastener in place. At such time, the bolt receiving opening in the nut will be in registration with the bolt receiving opening 14 in the part 13.

From the foregoing description, it will be apparent that a fastener made in accordance with the present invention may be made in a simple and expeditious manner and may be effectively locked in place against the part with which it is intended to be attached. Moreover, it will be apparent that the fastener is effectively held against movement during the bolt inserting operation.

I claim:

1. A fastener comprising a sheet metal strip, a nut, means for holding the nut on the strip, and means for securing said strip to a structure with the bolt receiving opening in said nut in substantial alignment with a bolt receiving opening in said structure for the passage of a threaded fastener, said last named means comprising a portion that extends through and substantially seals an aperture in said structure which is offset from said opening, and that underlies said structure, and has a prong extending out of the plane thereof for engaging the wall of said aperture.

2. A fastening device comprising a sheet metal strip having an opening therein, a nut having a cross sectional area larger than said opening and having a bolt receiving opening therein in registration with the opening in said strip, means for holding the nut against movement with respect to the strip, and means for securing the strip to a structure with the bolt receiving nut in substantial alignment with a bolt receiving opening in the structure for the passage of a threaded fastener, said last named means comprising a portion that extends across an aperture in said structure and substantially seals it, said portion including a prong extending out of the plane thereof for engaging a wall of the aperture and locking the strip onto the structure.

3. A fastener comprising a sheet metal strip having an opening therein, a nut having a cross-sectional area larger than said opening and having a bolt receiving opening therein, in registration with the opening in the strip, spaced members integral with the strip and extending out of the plane thereof for engaging opposite faces of the nut and holding it against movement with respect to the strip, and means for securing said strip to a structure with the bolt receiving opening in said nut in substantial alignment with a bolt receiving opening in said structure for the passage of a threaded fastener, said means comprising a portion that is adapted to extend across an aperture in said structure and seal the same, said aperture being offset from the opening in said structure and said sealing portion having a prong extending out of the plane thereof for engaging a wall of said aperture.

4. A fastener comprising a sheet metal strip having an opening therein, a nut carried by the strip, and having a bolt receiving opening in registration with the opening in the strip and means for securing said strip to a structure with the bolt receiving opening in said nut in substantial alignment with a bolt receiving opening in said structure for the passage of a threaded fastener, said last named means comprising a tongue and a prong extending out of the plane of the strip for engaging opposite walls of an aperture in said structure which is offset from said opening and sealing the same.

5. A fastener comprising a sheet metal strip having an opening therein, a nut fastened to the strip, and having its bolt-receiving opening in registration with the opening in the strip, and means for securing the strip to a structure with the bolt-receiving opening in the nut in substantial registration with a bolt-receiving opening in the structure for the passage of a threaded fastener, said means comprising a portion that extends across an aperture which is offset from said opening in said structure, and said strip having spaced shoulders for engaging opposite walls in the aperture and locking the fastener to said structure, one of the shoulders comprising a tongue and the other comprising a projection that is struck from the strip at a point that is spaced from the end thereof.

6. A fastening device, comprising a sheet-metal strip of uniform width throughout its length and applicable to a part to be joined through an assembly slot therein, the fastening having one portion overlying the part and another portion underlying said part, the overlying portion having an opening therein, a nut attached to the overlying portion with its bolt-receiving opening in registration with the opening in said portion, the junction of the overlying and underlying portions providing a shoulder for engaging one wall of said slot in the part to be joined, and the underlying portion having a pair of prongs thereon for engaging the opposite wall of said slot, whereby said shoulder and said prongs cooperate to lock the fastener to said part.

7. A fastening device, comprising a sheet-metal strip having an opening therein, a nut attached to the strip with the opening therein in registration with the opening in the strip and means for securing said strip to a structure with the bolt-receiving opening in the nut in substantial registration with a bolt-receiving opening in said structure for the passage of a threaded fastener, said last-named means including a tongue that is adapted to engage the structure on the side opposite that portion of the strip which carries the nut, and said means also including a portion that extends across an aperture which is offset from the opening in said structure, and a prong struck from the last-named portion intermediate the tongue and the end of the strip opposite that which carries the nut for engaging a wall of the aperture and cooperating with the tongue to lock the fastener to the structure.

GEORGE A. TINNERMAN